(12) United States Patent
Lin et al.

(10) Patent No.: US 9,298,323 B2
(45) Date of Patent: Mar. 29, 2016

(54) SENSING ELECTRODE STRUCTURE AND TOUCH PANEL EMPLOYING THE SAME

(71) Applicants: Chun-Chi Lin, Mailiao (TW); Sean Hsi Yuan Wu, Taipei (TW); Chien-Min Lai, Taipei (TW)

(72) Inventors: Chun-Chi Lin, Mailiao (TW); Sean Hsi Yuan Wu, Taipei (TW); Chien-Min Lai, Taipei (TW)

(73) Assignee: TPK Touch Solutions Inc., Taipei (TW)

( * ) Notice: Subject to any disclaimer, the term of this patent is extended or adjusted under 35 U.S.C. 154(b) by 329 days.

(21) Appl. No.: 13/723,066

(22) Filed: Dec. 20, 2012

(65) Prior Publication Data

US 2014/0174788 A1    Jun. 26, 2014

(51) Int. Cl.
    *G06F 3/044* (2006.01)
    *G06F 3/047* (2006.01)
    *H01B 5/00* (2006.01)

(52) U.S. Cl.
    CPC ..................... *G06F 3/044* (2013.01)

(58) Field of Classification Search
    None
    See application file for complete search history.

(56) References Cited

U.S. PATENT DOCUMENTS

| 2005/0270273 A1 | 12/2005 | Marten |
| 2009/0002337 A1* | 1/2009 | Chang .......................... 345/174 |
| 2011/0007020 A1* | 1/2011 | Hong et al. .................... 345/174 |
| 2011/0310033 A1* | 12/2011 | Liu et al. ...................... 345/173 |

FOREIGN PATENT DOCUMENTS

TW          201025104  A1    7/2010

* cited by examiner

*Primary Examiner* — Kumar Patel
*Assistant Examiner* — Amy C Onyekaba
(74) *Attorney, Agent, or Firm* — Gokalp Bayramoglu

(57) ABSTRACT

An embodiment of the present disclosure provides a sensing electrode structure comprising a plurality of first axial electrodes and a plurality of second axial electrodes. The second axial electrodes and the first axial electrodes are formed on same side of a substrate and are electrically insulated from each other. Each of the first axial electrodes has a plurality of first conductive patterns with grid structures, and the first conductive patterns with grid structures are electrically connected with each other. Each of the second axial electrodes has a plurality of second conductive patterns with grid structures, and the second conductive patterns with grid structures are electrically connected with each other.

17 Claims, 13 Drawing Sheets

SENSING ELECTRODE STRUCTURE AND TOUCH PANEL EMPLOYING THE SAME

BACKGROUND OF THE INVENTION

This Application claims the benefit of the People's Republic of China Application No. 201110456745.5, filed on Dec. 27, 2011.

FIELD OF THE INVENTION

The present disclosure relates to a touch panel, more particularly to a sensing electrode structure and a touch panel employing the same.

DESCRIPTION OF THE RELATED ART

With improvement of design technologies relating to semiconductor and electric circuits, current touch devices comprise touch panels and controllers, which are massively applied in handheld devices and other electronic devices. For example, existing smart phones have a touch panel. Wherein the touch panel has a sensing electrode array, and wherein the sensing electrode array has a plurality of scan lines and a plurality of drive lines. The controller can transmit driving signals to the drive lines of the sensing electrode array and receive sensing signals from the scan lines for determining touch areas on the touch panel by users.

With reference to FIG. 1, FIG. 1 is a platform diagram of a sensing electrode structure of a traditional touch panel. The touch panel comprises a substrate and a sensing electrode structure formed on a same surface of the substrate. The sensing electrode structure has a plurality of first axial electrodes 11 and a plurality of second axial electrodes 12 which can form a sensing electrode array for sensing touch areas.

As shown in FIG. 1, the first axial electrodes 11 are X axial electrodes, and the second axial electrodes 12 are Y axial electrodes. Each of the first axial electrodes 11 has a plurality of rhombic conductive patterns 111, wherein each of the rhombic conductive patterns 111 is electrically connected to the adjacent rhombic conductive pattern 111 through a first conductive component 112. Each of the second axial electrodes 12 has a plurality of rhombic conductive patterns 121, wherein each of the rhombic conductive patterns 121 is electrically connected to the adjacent rhombic conductive pattern 121 through a second conductive component 122. Moreover, the sensing electrode structure further comprises a plurality of insulating spacers (not shown in FIG. 1) respectively disposed between the second conductive component 122 and the corresponding first conductive component 112 for electrically insulting the first axial electrodes 11 and the second axial electrodes 12.

Length of adjacent edge between the rhombic conductive patterns 111 and 121 would affect capacitance value of coupling capacitor, which means when the length is longer, the capacitance value is bigger. If the capacitance values of coupling capacitors induced between the first axial electrodes and the second axial electrodes are not big enough, the sensing uniformity of the sensing electrode array is not ideal. Further, linearity of lineation of the touch panel would be affected.

FIG. 2A and FIG. 2B illustrate schematic view diagrams of linearity of lineation on the traditional touch panel by respectively using 5 cm and 6 cm of copper columns. As shown in FIG. 2A and FIG. 2B, users drew lines from left-up to right-down and from right-up to left-down with a speed of 10 meters per second, and the sensing electric circuit determined that trace of lineation on the touch panel is 21 to 24. FIG. 2A and FIG. 2B, therefore demonstrate that linearity of lineation on the touch panel employing rhombic conductive patterns 111 and 121 is not smooth enough.

In order to improve linearity of lineation of the touch panel, it is necessary to introduce a new conductive pattern in the sensing electrode structure of the touch panel.

SUMMARY OF THE INVENTION

The present disclosure increases coupling capacitance value that is produced between conductive patterns and then improves linearity of lineation of touch panels by altering the conductive patterns in a sensing electrode structure of the touch panel.

An embodiment of the present disclosure provides a sensing electrode structure comprising a plurality of first axial electrodes and a plurality of second axial electrodes. The second axial electrodes and the first axial electrodes are formed on a same side of a substrate and electrically insulated from each other. Each of the first axial electrodes has a plurality of first conductive patterns with grid structures, and the first conductive patterns with grid structures are electrically connected with each other. Each of the second axial electrodes has a plurality of second conductive patterns with grid structures, and the second conductive patterns with grid structures are electrically connected with each other.

Another embodiment of the present disclosure also provides a touch panel comprising a substrate and the foregoing sensing electrode structure.

In conclusion, an embodiment of the present disclosure provides a sensing electrode structure of a touch panel. Conductive patterns in the sensing electrode structure can improve sensing uniformity through the increased capacitance value of coupling capacitor for further improving linearity of lineation of the touch panel, thereby increasing sensing precision.

In order to further understand characteristics and technical aspects of the present disclosure, several descriptions accompanied with drawings are described in detail below. However, descriptions and accompanying drawings are for purposes of reference and specification only, not for limiting the present disclosure.

DETAILED DESCRIPTION OF THE EMBODIMENTS

Figure 1:
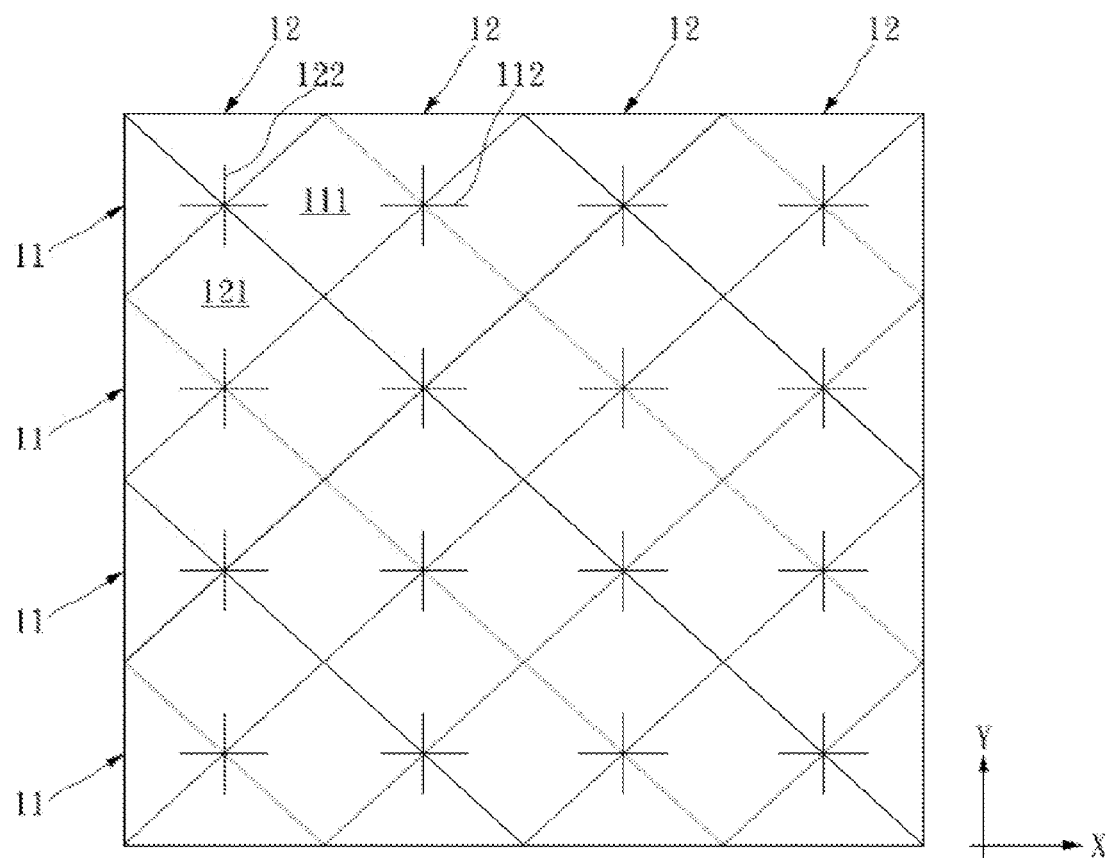
FIG. 1 is a platform diagram of a sensing electrode structure of a traditional touch panel.
Figure 2A:
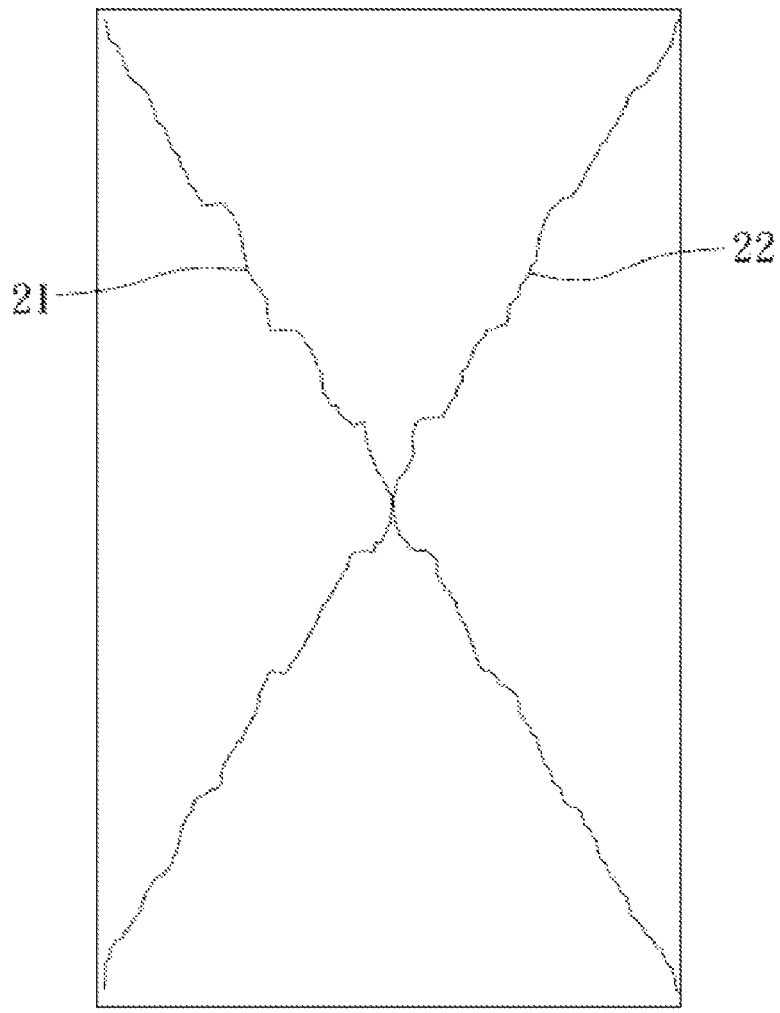
FIG. 2A and FIG. 2B are schematic view diagrams of linearity of lineation drawn on the traditional touch panel by respectively using 5 cm and 6 cm of copper columns.
Figure 2B:
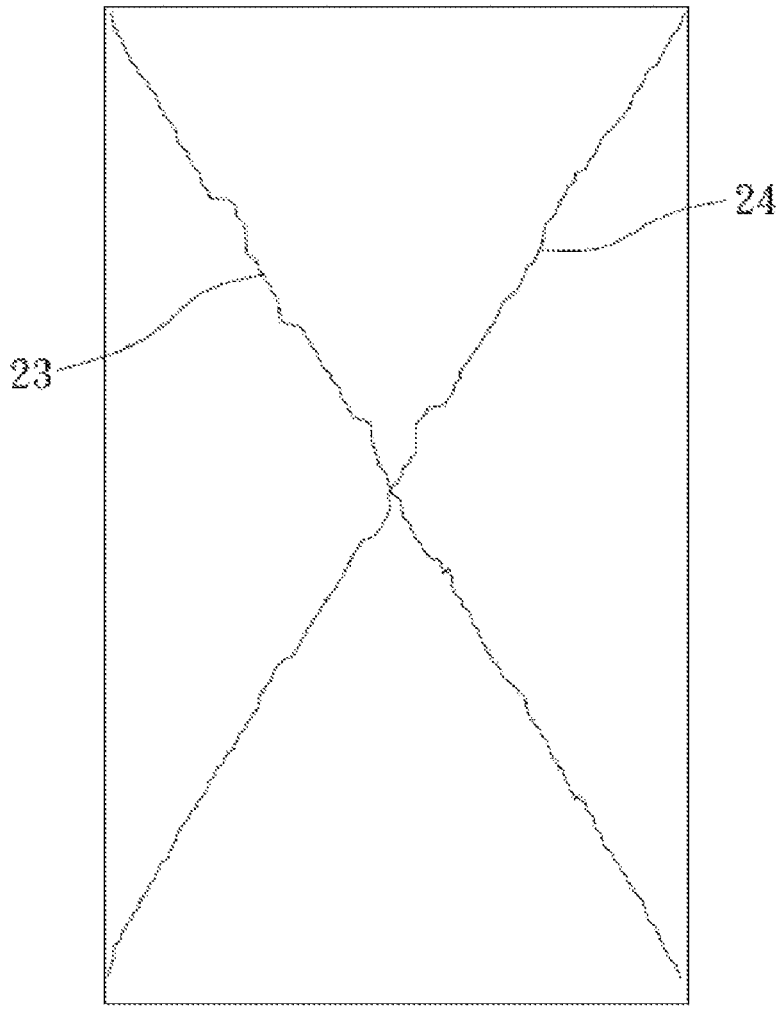
Figure 3:
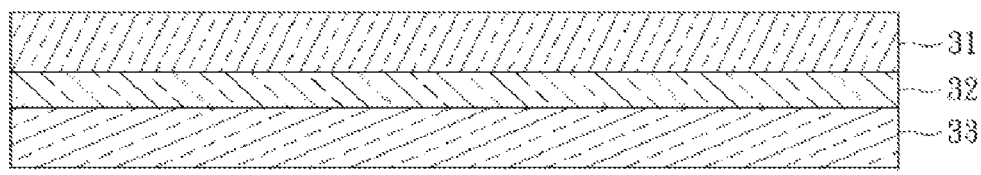
FIG. 3 is a section view diagram of a touch panel 1 accordance with an embodiment of the present disclosure.

With reference to FIG. 3, FIG. 3 is a section view diagram of a touch panel in accordance with an embodiment of the present disclosure. A touch panel 3 provided by this embodiment comprises a protective layer 31, a conductive layer 32, and a substrate 33. The conductive layer 32 can be, for example, made of Indium Tin Oxide (ITO), and formed on the substrate 33. The conductive layer 32 further forms a sensing electrode structure through a process of patterning for sensing touch areas. Accordingly, this embodiment can construct a sensing electrode structure with a single layer ITO. Moreover, the protective layer 31 is further formed on the protective layer 32 for fully overlaying the sensing electrode structure to provide a function of protecting the sensing electrode structure. It is to be noted that sectional structure of the foregoing touch panel 3, material of the conductive layer 32 and shapes, structures, and specific forms of each kind of sensing electrode structures that are hereinafter described in detail are all illustrations and preferred embodiments and not to be construed as limiting the present disclosure in any manner.

Figure 4:
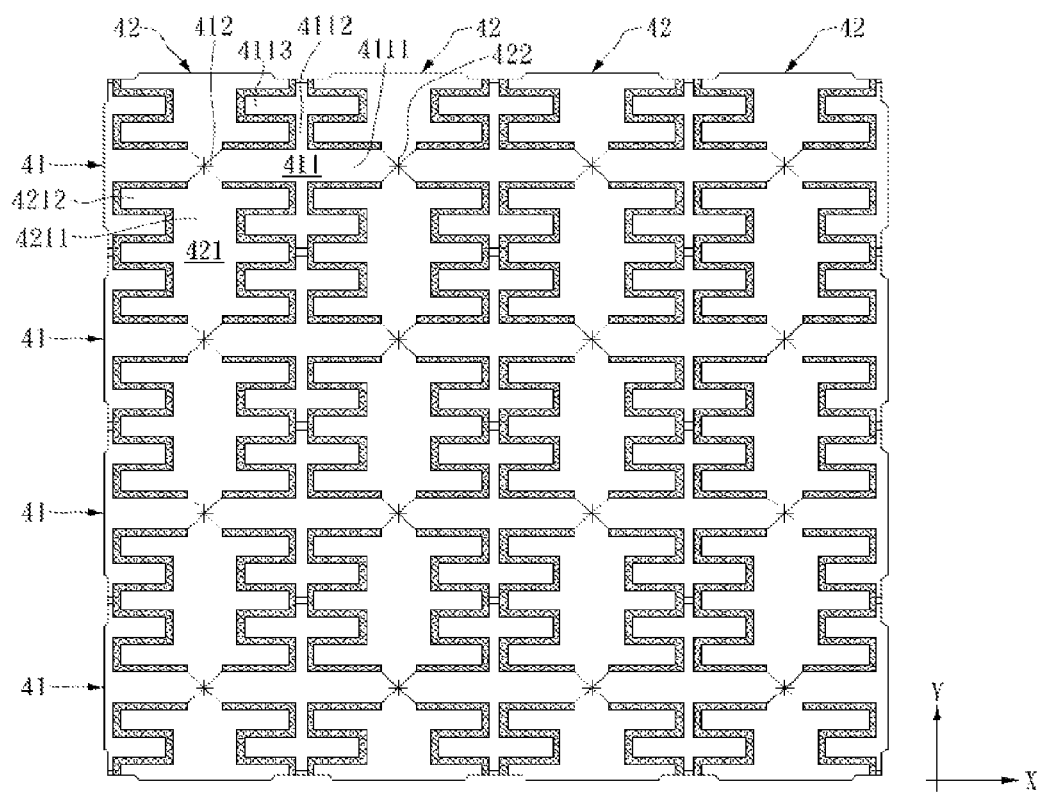
FIG. 4 is a platform diagram of a sensing electrode structure touch panel in accordance with an embodiment of the present disclosure.

With reference to FIG. 4, based on the structure of the touch panel as FIG. 3, FIG. 4 is a platform diagram of a sensing electrode structure of a touch panel in accordance with an embodiment of the present disclosure. The sensing electrode structure of this embodiment comprises a plurality of first axial electrodes 41 and a plurality of second axial electrodes 42. For example, the first axial electrodes 41 are X axial electrodes, and the second axial electrodes 42 are Y axial electrodes corresponding to the first axial electrodes 41. The first axial electrodes 41 and the second axial electrodes 42 of this embodiment are formed on a same side of the substrate 32 and electrically insulated from each other. Moreover, electrical insulation between the first axial electrodes 41 and the second axial electrodes 42 are formed by a method of fractal cutting, cutting lines of which are in a reticulation-like conformation for enhancing optical compensation effect. However, the cutting method of the first axial electrodes 41 and the second axial electrodes 42 is not limited by this embodiment.

Each of the first axial electrodes 41 comprises a plurality of first conductive patterns 411 with grid structures, and the first conductive patterns 411 with grid structures are electrically connected with each other. Each of the second axial electrodes 42 comprises a plurality of second conductive patterns 421 with grid structures, and the second conductive patterns 421 with grid structures are electrically connected with each other.

More particularly, each of the first axial electrodes 41 further comprises a plurality of first conductive components 412 respectively for electrically connecting the adjacent first conductive patterns 411 with grid structures in the first axial electrode 41, and each of the second axial electrodes 42 further comprise a plurality of second conductive components 422 respectively for electrically connecting the adjacent second conductive patterns 421 with grid structures in the second axial electrode 42. Moreover, the sensing electrode structure further comprises a plurality of insulating spacers (not shown in FIG. 4) respectively disposed between the first conductive components 412 and the corresponding second conductive components 422, so that the first conductive components 412 are practically connected to two adjacent first conductive patterns 411 with grid structures as a bridge form, and the first axial electrodes 41 and the second axial electrodes 42 can be electrically insulated from each other. Additionally, the first conductive components 412 of this embodiment can be designed with conductive materials such as metal wires, Indium Tin Oxide and the like.

Each of the first conductive patterns 411 with grid structures comprises a backbone structure 4111, a plurality of branch structures 4112, and a plurality of first sub-branch structures 4113. The backbone structures 4111 of two adjacent first conductive patterns 411 with grid structures on the first axis are electrically connected with each other through the first conductive components 412. Furthermore, two branch structures 4112 of this embodiment respectively extend on both sides of the backbone structure 4111, and every two first sub-branch structures 4113 respectively extend on both sides of one branch structure 4112.

Furthermore, as shown in FIG. 4, the first conductive patterns 411 with grid structures can be symmetrical conductive patterns. In addition the backbone structure 4111 extends along X axis, and the first sub-branch structures 4113 of the first conductive patterns 411 with grid structures extend on both sides of middle part of the branch structures 4112. The first sub-branch structures 4113 can be parallel to the backbone structure 4111, i.e., the first sub-branch structure 4118 extends along X axis, and the branch structures 4112 can be vertical to the backbone structure 4111 i.e. the branch structure 4112 extends along Y axis. Except this, length and width of each of the first conductive patterns 411 with grid structures can be respectively same as length and width of area of the former rhombic conductive pattern, which respectively are 5.63 cm and 5.51 cm for example.

Each of the second conductive patterns 421 with grid structures comprises a backbone structure 4211 and a plurality of branch structures 4212. The backbone structures 4211 of two adjacent second conductive patterns 421 with grid structures on the second axis are electrically connected with each other through the second conductive components 422. Furthermore, in this embodiment, every two branch structures 4212 respectively extend on both sides of the backbone structure 4211.

Furthermore, as shown in FIG. 4, the second conductive patterns 421 with grid structures can be symmetrical conductive patterns. In addition, the branch structures 4212 of the second conductive patterns 421 with grid structures extend on both sides of upper part, middle part and lower part of the backbone structures 4211, and the branch structures 4212 can be vertical to the backbone structure 4211. Except this, length and width of each of the second conductive patterns 421 with grid structures can be respectively same as length and width of area of the former rhombic conductive pattern, which respectively are 5.63 cm and 5.51 cm for example.

It is to be noted that the proposed design of the foregoing first conductive patterns 411 and second conductive patterns 421 with grid structures is merely for illustration purposes and does not limit the present disclosure in any manner. The present disclosure increases side length of each of the first conductive patterns 411 adjacent to each of the second conductive patterns 421 by a grid structural design for improving capacitance value. Therefore, linearity of lineation of the touch panel is improved and variation of sensing signal by multi-point touching is increased. Any other grid structures that are able to efficiently increase side length of the conductive patterns can be applied in the sensing electrode array of the present disclosure. In practical design, the grid structure of the present disclosure can be designed as palisade shape, fence shape and so on.

Figure 5:
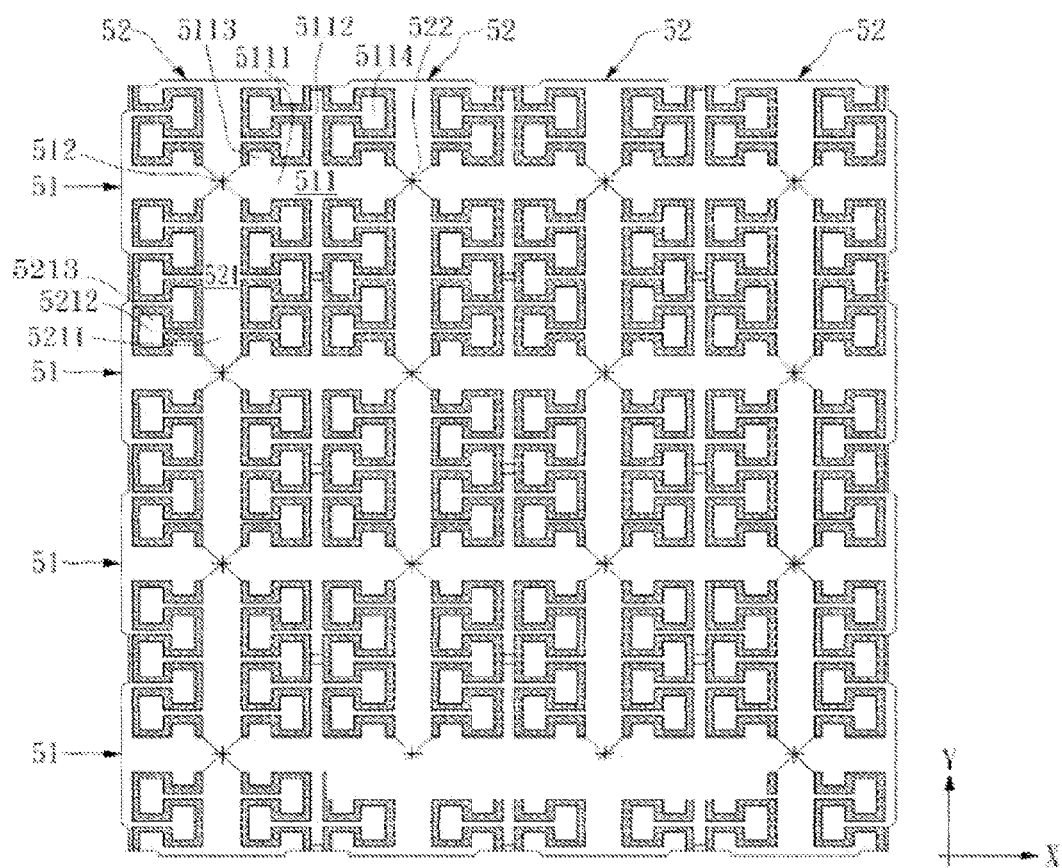
FIG. 5 is a platform diagram of a sensing electrode structure of a touch panel in accordance with another embodiment of the present disclosure.

With reference to FIG. 5, FIG. 5 is a platform diagram of a sensing electrode structure of a touch panel in accordance with another embodiment of the present disclosure. Difference between sensing electrode structures of FIG. 5 and FIG. 4 lies in a different conductive pattern of the grid structure. Accordingly, only the first conductive patterns 511 of the first axial electrodes 51 the X axial electrodes) and the second conductive patterns 521 of the second axial electrodes 52 (i.e., the Y axial electrodes) are described below.

Each of the first conductive patterns 511 with grid structures comprises a backbone structure 5111, a plurality of branch structures 5112, a plurality of first sub-branch structures 5113, and a plurality of second sub-branch structures 5114. The backbone structures 5111 of two adjacent first conductive patterns 511 with grid structures on the first axis (i.e., X axis) are electrically connected with each other through the first conductive components 512. Furthermore, in this embodiment, the backbone structure 5111 extends along X axis, and every two first sub-branch structures 5113 respectively extend, alone Y axis, on both sides of one of two ends of the backbone structure 5111 and two branch structures 5112 respectively extend, along Y axis, on both sides of middle part of the backbone structure 5111. Similarly, every two second sub-branch structures 5114 respectively extend, along X axis, on both sides of any branch structure 5112 which extends from middle part of the backbone structure 5111.

Furthermore, as shown in FIG. 5, the first conductive patterns 511 with grid structures can be symmetrical conductive patterns, in addition, the second sub-branch structures 5114 of the first conductive patterns 511 with grid structures extend on both sides of middle part of the branch structures 5112, and any second sub-branch structure 5114 is formed of one big and one small rectangular structures, wherein the connected part of the branch structure 5112 with the second sub-branch structure 5114 is a smaller rectangular structure, and the end part of the second sub-branch structure 5114 is a bigger rectangular structure. Width, along X axis, of the branch structure 5112 is less than the width, along X axis, of the first sub-branch structure 5113. The second sub-branch structures 5114 can be parallel to the backbone structure 5111, and the branch structures 5112 and the first sub-branch structures 5113 can be vertical to the backbone structure 5111. Except this, length and width of each of the first conductive patterns 511 with grid structures can be respectively same as length and width of area of the former rhombic conductive pattern, which respectively are 5.63 cm and 5.51 cm for example.

Each of the second conductive patterns 521 with grid structures comprises a backbone structure 5211, a plurality of branch structures 5212 and a plurality of first sub-branch structures 5213. The backbone structures 5211 of two adjacent second conductive patterns 521 with grid structures on the second axis (i.e., Y axis) are electrically connected with each other through the second conductive components 522. Furthermore, in this embodiment, the backbone structure 5211 extends along Y axis, and every two branch structures 5212 respectively extend along X axis, on both sides of the backbone structure 5211. Any branch structure 5212 is formed of one big and one small rectangular structure, wherein the connected part of the branch structure 5212 with the backbone structure 5211 is a smaller rectangular structure, and the end part of the branch structure 5212 is a bigger rectangular structure. In addition, the bigger rectangular structure may be formed as the first sub-branch structures 5213 extending from the end of the branch structure 5212, along Y axis.

Furthermore, as shown in FIG. 5, the second conductive patterns 521 with grid structures can be symmetrical conductive patterns in addition, the branch structures 5212 of the second conductive patterns 521 with grid structures extend on both sides of upper part, middle part and lower part of the backbone structures 5211, and the branch structures 5212 can be vertical to the backbone structure 5211. Except this, length and width of each of the second conductive patterns 521 with grid structures can be respectively same as length and width of area of the former rhombic conductive patterns, which respectively are 5.63 cm and 5.51 cm for example.

Figure 6:
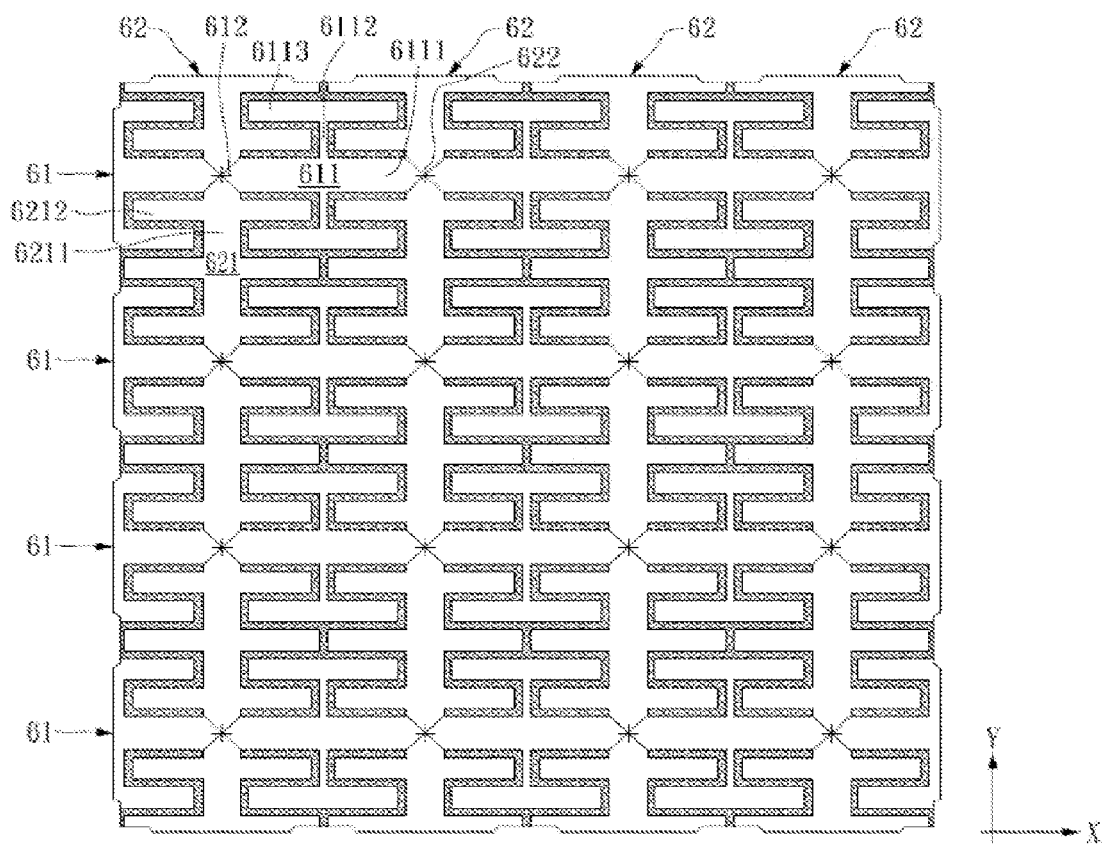
FIG. 6 is a platform diagram of a sensing electrode structure of a touch panel in accordance with another embodiment of the present disclosure.

With reference to FIG. 6, FIG. 6 is a platform diagram of a sensing electrode structure of a touch panel in accordance with another embodiment of the present disclosure. Difference between sensing electrode structures of FIG. 6 and FIG. 4 lies in a different conductive pattern of the grid structure. Accordingly, only the first conductive patterns 611 of the first axial electrodes 61 and the second conductive patterns 621 of the second axial electrodes 62 are described below.

Each of the first conductive patterns 611 with grid structures comprises a backbone structure 6111, a plurality of branch structures 6112, and a plurality of sub-branch structures 6113. The backbone structures 6111 of two adjacent first conductive patterns 611 with grid structures on the first axis are electrically connected with each other through the first conductive components 612. Furthermore, two branch structures 6112 of this embodiment respectively extend from both sides of the backbone structure 6111, and every two sub-branch structures 6113 respectively extends on both sides of one branch structure 6112.

Furthermore, as shown in FIG. 6, the first conductive patterns 611 with grid structures can be symmetrical conductive patterns. In addition, the sub-branch structures 6113 of the first conductive patterns 611 with grid structures extend on both sides of end part of the branch structures 6112, the sub-branch structures 6113 can be parallel to the backbone structure 6111, and the branch structures 6112 can be vertical to the backbone structures 6111. Except this, length and width of each of the first conductive patterns 611 with grid structures can be respectively same as length and width of area of the former rhombic conductive pattern, which respectively are 5.63 cm and 5.51 cm.

Each of the second conductive patterns 621 with grid structures comprises a backbone structure 6211 and a plurality of branch structures 6212. The backbone structures 6211 of two adjacent second conductive patterns 621 with grid structures on the second axis are electrically connected with each other through the second conductive components 622. Furthermore, in this embodiment, every two branch structures 6212 respectively extend on both sides of the backbone structure 6211.

Furthermore, as shown in FIG. 6, the second conductive patterns 621 with grid structures can be symmetrical conductive patterns. In addition, the branch structures 6212 of the second conductive patterns 621 with grid structures extend on both sides of upper part, middle part and lower part of the backbone structures 6211, and the branch structures 6212 can be vertical to the backbone structure 6211. Except this, length and width of each of the second conductive patterns 621 with grid structures can be respectively same as length and width of area of the former rhombic conductive pattern, which respectively are 5.63 cm and 5.51 cm.

Figure 7:
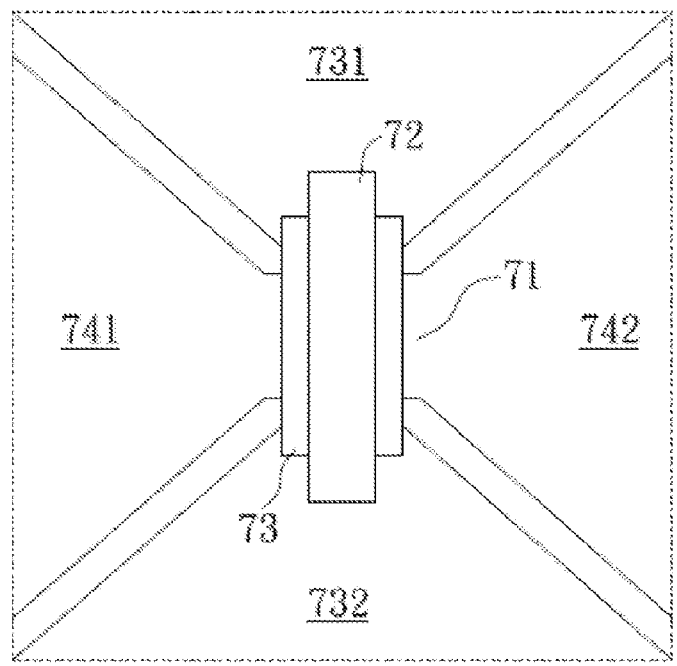
FIG. 7 is an enlargement platform diagram of an intercrossed part of conductive components of different axes in accordance with an embodiment of the present disclosure.

With reference to FIG. 7, FIG. 7 is an enlargement platform diagram of an intercrossed part of conductive components of different axes in accordance with an embodiment of the present disclosure. As shown in FIG. 7, first conductive patterns 741 and 742 of first axial electrode with grid structures are electrically connected with each other through first conductive component 71, and second conductive patterns 731 and 732 of second axial electrode with grid structures are electrically connected with each other through second conductive component 72. In addition, as the foregoing description, an insulating spacer 73 is further disposed between the first conductive component 71 and the second conductive component 72 for electrically insulting the first axial electrode and the second axial electrode.

Figure 8:
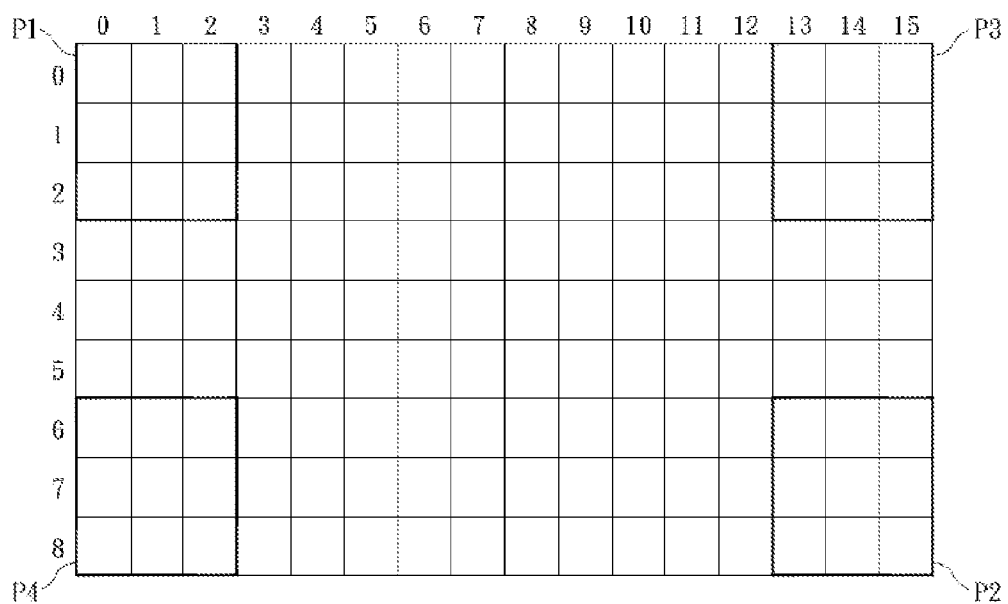
FIG. 8 is a schematic diagram of each sensing point in a touch panel in accordance with an embodiment of the present disclosure.
Figure 9A:
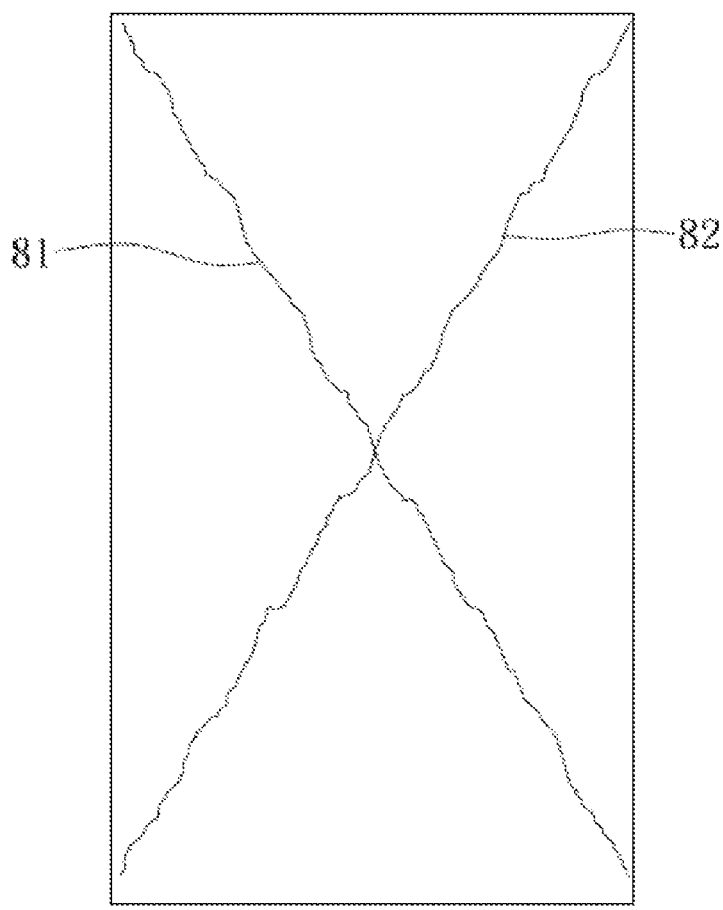
FIG. 9A and FIG. 9B are schematic diagrams of linearity of lineation on a touch panel with a sensing electrode structure as FIG. 4 by respectively using 5 cm and 6 cm columns.
Figure 9B:
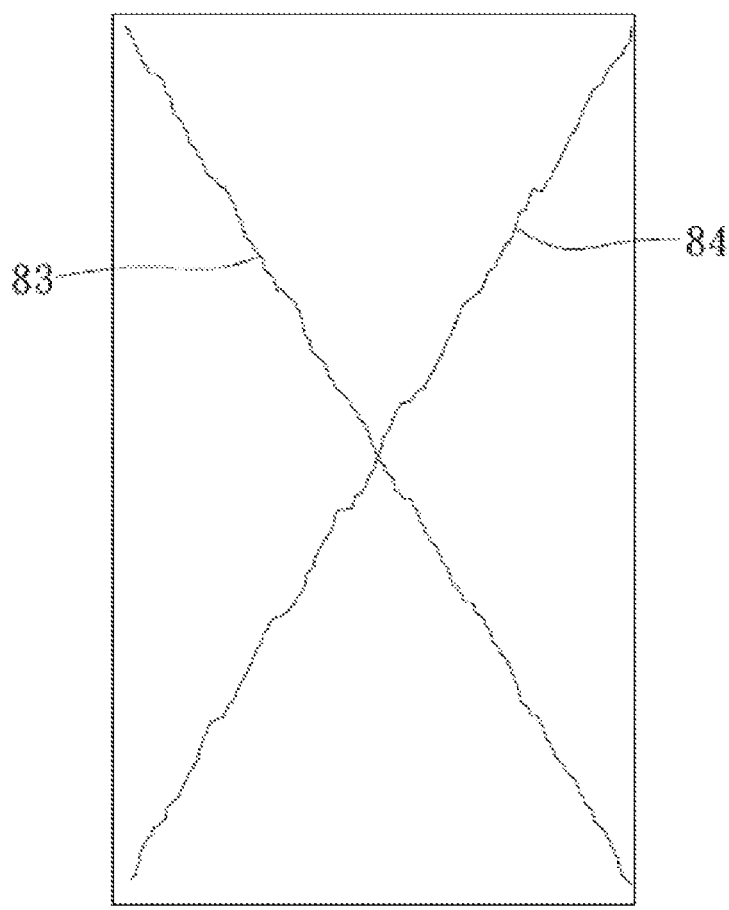
Figure 10A:
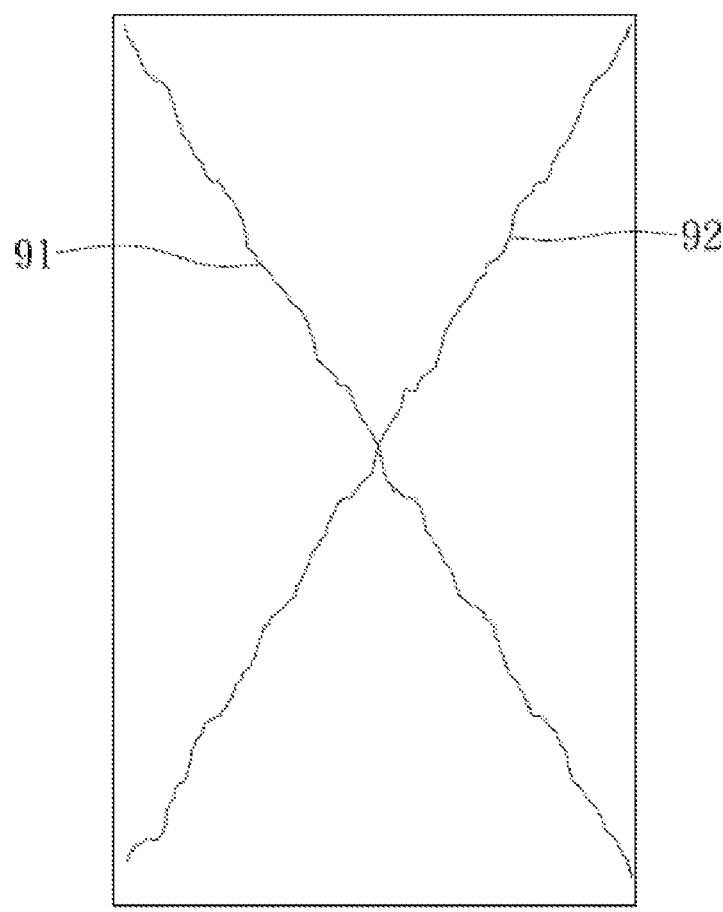
FIG. 10A and FIG. 10B are schematic diagrams of linearity of lineation on a touch panel with a sensing electrode structure as FIG. 5 by respectively using 5 cm and 6 cm columns.
Figure 10B:
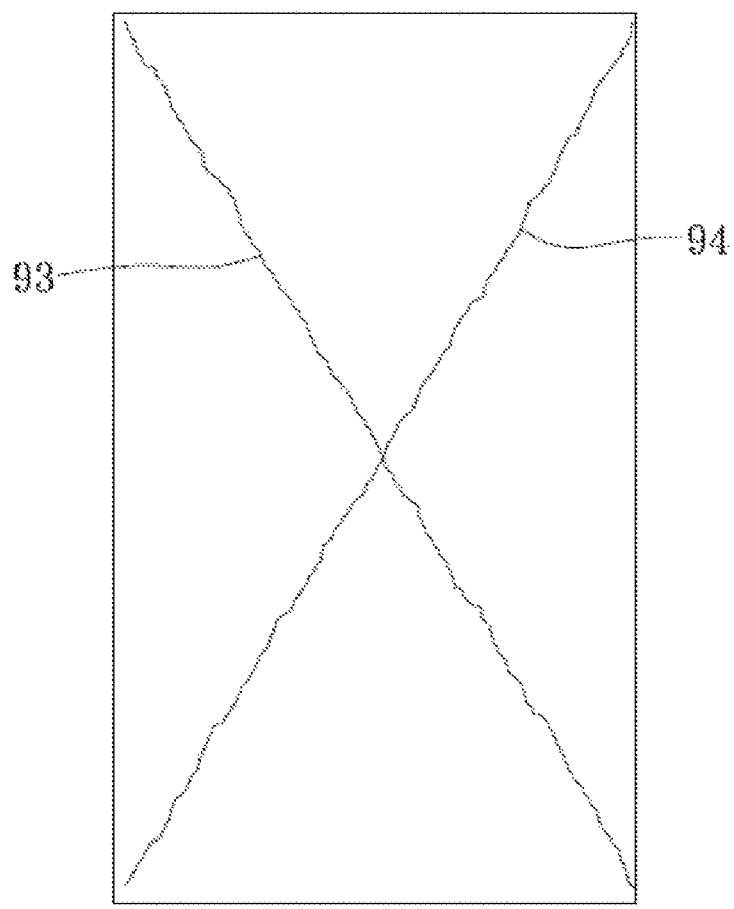

With reference to FIG. 8, FIG. 8 is a schematic diagram of each sensing point in a touch panel in accordance with an embodiment of the present disclosure. For illustration, it is assumed that users accumulatively add touch points in order by means of touch areas P1 to P4 on the touch panel of FIG. 8 to form multi-point touch. Accordingly, if the sensing electrode structures of the touch panel are respectively experienced with conductive patterns as shown in FIG. 4, FIG. 5 and FIG. 6 and the former rhombic conductive patterns, it can be seen from the experiential data that attenuations of sensing signal determined from different conductive patterns are respectively 40.5%, 30.28%, 38.11% and 56.7% when touch area P1 to P4 have all been touched and variations of sensing signal have been determined to be respectively 496, 663, 583 and 300. In view of this, signal attenuation of the conductive patterns with grid structures is lower that that of the rhombic conductive patterns, and signal variation of the conductive patterns with grid structures is higher than that of the rhombic conductive patterns.

Figure 11A:
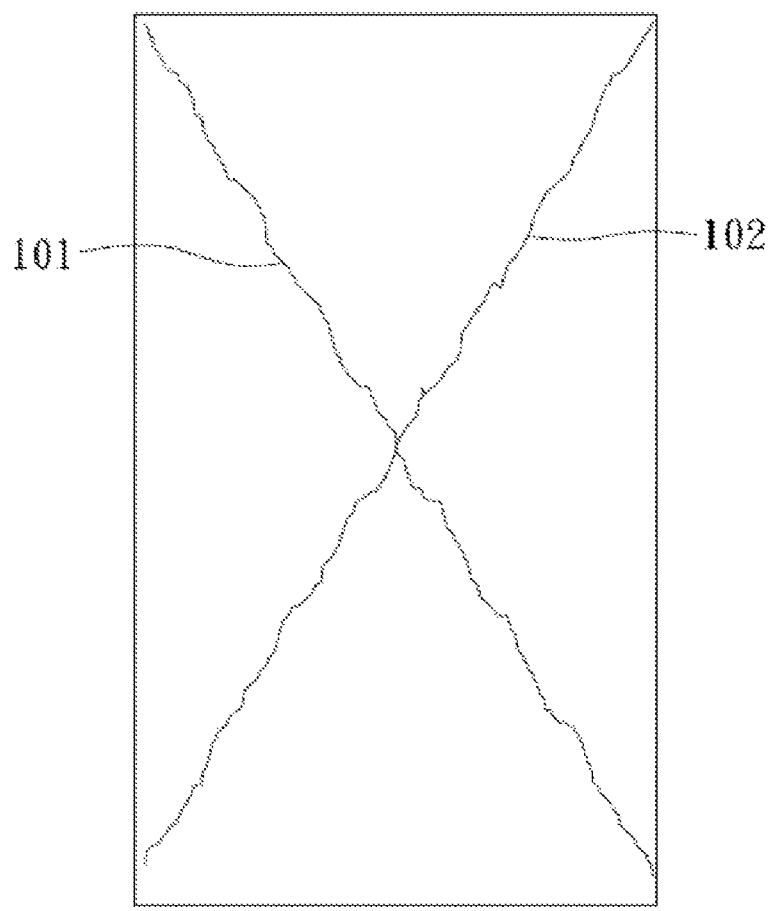
FIG. 11A and FIG. 11B are schematic diagrams of linearity of lineation on a touch panel with a sensing electrode structure as FIG. 6 by respectively using 5 cm and 6 cm columns.
Figure 11B:
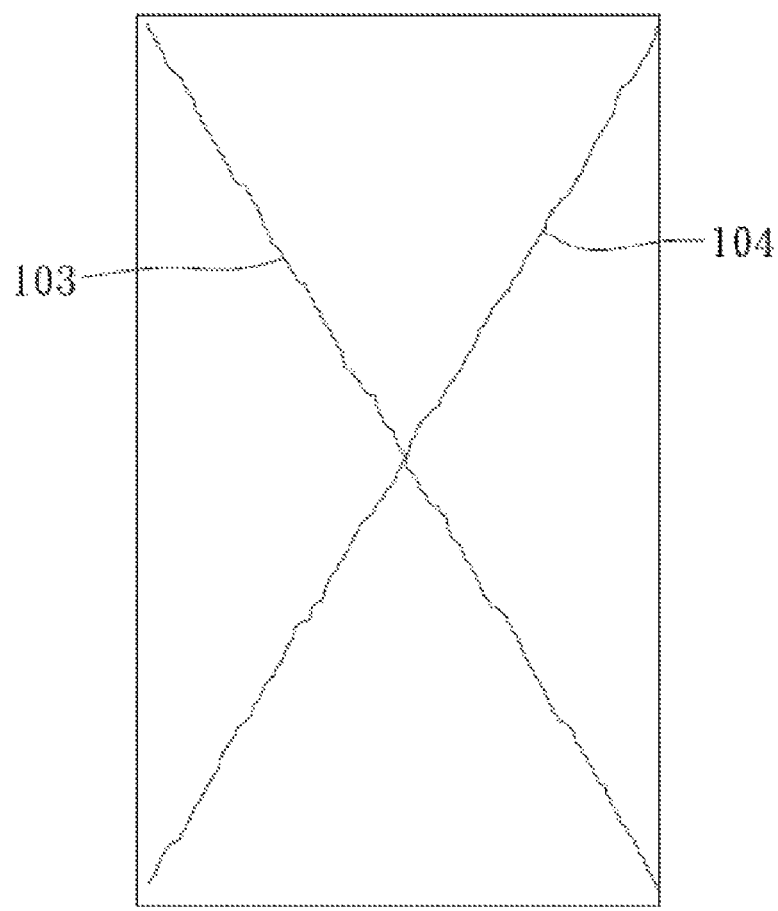

With reference to FIG. 9A to FIG. 11B, FIG. 9A and FIG. 9B are schematic diagrams of linearity of lineation on a touch panel with a sensing electrode structure as shown in FIG. 4 using 5 cm and 6 cm columns. FIG. 10A and FIG. 10B are schematic diagrams of linearity of lineation on a touch panel with a sensing electrode structure as shown in FIG. 5 using 5 cm and 6 cm columns. FIG. 11A and FIG. 11B are schematic diagrams of linearity of lineation on a touch panel with a sensing electrode structure as shown in FIG. 6 by respectively using 5 cm and 6 cm columns.

FIG. 9A to FIG. 11B illustrate user drawn lines from left-up to right-down and from right-up to left-down with a speed of 10 meters per second, Wherein an employed sensing electric circuit determined that trace of lineation on the touch panel employing the sensing electrode structure, as shown in FIG. 4, is 81~84, that trace of lineation on the touch panel employing the sensing electrode structure, as shown in FIG. 5, is 91~94, and trace of lineation on the touch panel employing the sensing electrode structure, as shown in FIG. 6, is 101~104. Therefore, as illustrated in FIG. 9A to FIG. 11B, in contrast with the sensing electrode structure employing the traditional rhombic conductive patterns, the touch panels employing the sensing electrode structure as shown in FIG. 4 to FIG. 6 can have preferable linearity of lineation.

In conclusion, the embodiment of the present disclosure provides a sensing electrode structure of a touch panel. The conductive patterns with grid structure in the sensing electrode structure can increase linearity of lineation of the touch panel, and when the touch panel has been multi-point touched, variation of sensing signal on the touch area is not significantly reduced because of multi-point touching, thereby efficiently improving sensing precision.

The foregoing description is the embodiment of the present disclosure only, and not intent to limit the scope of the present disclosure.

What is claimed is:

1. A sensing electrode structure comprising:
   a plurality of first axial electrodes, wherein each of the first axial electrodes comprises a plurality of first conductive patterns, and the first conductive patterns are electrically connected with each other; and
   a plurality of second axial electrodes formed on same side of a substrate with the first axial electrodes and electrically insulated from the first axial electrodes, wherein each of the second axial electrodes comprises a plurality of second conductive patterns, and wherein the second conductive patterns are electrically connected with each other,
   wherein the first and the second conductive patterns each comprises a backbone structure, a plurality of branch structures, and a plurality of first sub-branch structures, and wherein the branch structures connect opposite sides of the backbone structure, and
   wherein each of the first sub-branch structures of the first conductive patterns connects a free end of the backbone structure of the first conductive patterns, and the width, along a first axis, of the first sub-branch structures of the first conductive patterns is larger than the width, along the first axis, of the branch structures of the first conductive patterns.

2. The sensing electrode structure of claim 1, wherein each of the first axial electrodes further comprises a plurality of first conductive components, and wherein each of the first conductive components connects to the corresponding first sub-branch structures of the first conductive patterns for electrically connecting the adjacent first conductive patterns in the first axial electrode.

3. The sensing electrode structure of claim 2, wherein each of the second axial electrodes further comprises a plurality of second conductive components, and wherein each of the second conductive components connects to a free end of the corresponding backbone structures of the second conductive patterns for electrically connecting the adjacent second conductive patterns in the second axial electrode.

4. The sensing electrode structure of claim 3, further comprising a plurality of insulating spacers respectively disposed between the first conductive components and the corresponding second conductive components.

5. The sensing electrode structure of claim 1, wherein each of the first conductive patterns further comprises a plurality of second sub-branch structures, and each of the second sub-branch structures connects to a side of the corresponding branch structure of the first conductive patterns, and each of the second sub-branch structures comprises an enlarged portion on a free end thereof.

6. The sensing electrode structure of claim 5, wherein the second sub-branch structures of the first conductive patterns extend on both sides of a middle part of the branch structures of the first conductive patterns, and wherein the second sub-branch structures are parallel to the backbone structure of the first conductive patterns, and wherein the branch structures of the first conductive patterns, are vertical to the backbone structure of the first conductive patterns.

7. The sensing electrode structure of claim 5, wherein the enlarged portion is a rectangular structure.

8. The sensing electrode structure of claim 1, wherein the first conductive patterns are symmetrical.

9. The sensing electrode structure of claim 1, wherein the branch structures of the second conductive patterns respectively extend on both sides of the backbone structure of second conductive patterns.

10. The sensing electrode structure of claim 1, wherein the second conductive patterns are symmetrical.

11. The sensing electrode structure of claim 1, wherein the branch structures of the second conductive patterns extend on both sides of a upper part, a middle part, and a lower part of the backbone structure of the second conductive patterns, and wherein the branch structures of the second conductive patterns are vertical to the backbone structure of the second conductive patterns.

12. The sensing electrode structure of claim 1, wherein each of the first sub-branch structures of the second conductive patterns connects a free end of the corresponding branch structure of the second conductive patterns, and the size of the first sub-branch structures of the second conductive patterns is larger than the branch structure of the second conductive patterns.

13. A touch panel comprising:
    a substrate; and
    a sensing electrode structure comprising a plurality of first axial electrodes and a plurality of second axial electrodes, wherein the second axial electrodes and the first axial electrodes are formed on same side of the substrate and are electrically insulated from each other, further wherein each of the first axial electrodes comprises a plurality of first conductive patterns electrically connected with each other, and each of the second axial electrodes comprises a plurality of second conductive patterns electrically connected with each other, wherein the first and the second conductive patterns each comprises a backbone structure, a plurality of branch structures, and a plurality of first sub-branch structures, and wherein the branch structures connect opposite sides of the backbone structure, and
    wherein each of the first sub-branch, structures of the first conductive patterns connects a free end of the backbone structure of the first conductive patterns; and the width, along a first axis, of the first sub-branch structures of the first conductive patterns is larger than the width, along the first axis, of the branch structures of the first conductive patterns.

14. The touch panel of claim 13, wherein the touch panel further comprises:
    a protective layer overlaid on the sensing electrode structure.

15. The touch panel of claim 13, wherein each of the first conductive patterns further comprises a plurality of second sub-branch structures, and each of the second sub-branch structures connects to a side of the corresponding branch structure of the first conductive patterns, and each of the second sub-branch structures comprises an enlarged portion on a free end thereof.

16. The touch panel of claim 13, wherein each of the first sub-branch structures of the second conductive patterns connects a free end of the corresponding branch structure of the second conductive patterns, and the size of the first sub-branch structures of the second conductive patterns is larger than the branch structure of the second conductive patterns.

17. The touch panel of claim 13, wherein each of the first axial electrodes further comprises a plurality of first conductive components, and each of the first conductive components connects to the corresponding first sub-branch structures of the first conductive patterns for electrically connecting the adjacent first conductive patterns in the first axial electrode;
    wherein each of the second axial electrodes further comprises a plurality of second conductive components, and each of the second conductive components connects to a free end of the corresponding backbone structures of the second conductive patterns for electrically connecting the adjacent second conductive patterns in the second axial electrode; and
    a plurality of insulating spacers are respectively disposed between the first conductive components and the corresponding second conductive components.

* * * * *